United States Patent [19]

Takagi et al.

[11] Patent Number: 4,866,612
[45] Date of Patent: Sep. 12, 1989

[54] IMAGING SYSTEM INCLUDING MEANS TO PROVIDE A DISPLAY IMAGE WITH SHADOWS AND THREE DIMENSIONAL PERSPECTIVES BY A COMBINATION OF VOXEL AND SURFACE METHOD

[75] Inventors: Hiroshi Takagi, Chiba; Yoshihiro Goto, Tokyo; Kazuhiro Sato, Ibaragi; Yoshikazu Okudo, Chiba; Osamu Takiguchi, Tokyo, all of Japan

[73] Assignee: Hitachi Medical Corporation, Tokyo, Japan

[21] Appl. No.: 21,903

[22] Filed: Mar. 4, 1987

[30] Foreign Application Priority Data

Mar. 5, 1986 [JP] Japan .................... 61-46410
Mar. 20, 1986 [JP] Japan .................... 61-60807

[51] Int. Cl.$^4$ ................... G06F 3/14; G06F 15/42
[52] U.S. Cl. ..................... 364/413.22; 364/413.16
[58] Field of Search ................ 364/414, 521-522, 364/518, 413.16, 413.22; 382/22; 340/728

[56] References Cited

U.S. PATENT DOCUMENTS

4,710,876 12/1987 Cline .................... 364/414
4,719,585 1/1988 Cline .................... 364/518
4,729,098 3/1988 Cline .................... 364/414

Primary Examiner—Jerry Smith
Assistant Examiner—Gail O. Hayes
Attorney, Agent, or Firm—Gerald J. Ferguson, Jr.

[57] ABSTRACT

A three-dimensional image display method for displaying a three-dimensional image including depth and distance information which consists of the steps of obtaining a densified three-dimensional image according to the distance information of an original three-dimensional image using a voxel method and modifying the densified three-dimensional image using a surface method. The surface method consists of the steps of determining each minute image element group including plural image elements proximate to each other over all image elements forming the densified three-dimensional image obtained under the voxel method, computing a density gradient defined by the each minute image element group based on density data of the plural image elements, substituting each modified density data modified according to the density gradient for the density data of the plural image elements obtained under voxel method, and displaying the modified density data on a display. A system for accomplishing this method is also provided.

23 Claims, 12 Drawing Sheets

| $C_{11}$ | $C_{12}$ | | $C_{1n}$ |
|---|---|---|---|
| $C_{21}$ | $C_{22}$ | | $C_{2n}$ |
| | | | |
| $C_{n1}$ | $C_{n2}$ | | $C_{nn}$ |

IMAGING SYSTEM INCLUDING MEANS TO PROVIDE A DISPLAY IMAGE WITH SHADOWS AND THREE DIMENSIONAL PERSPECTIVES BY A COMBINATION OF VOXEL AND SURFACE METHOD

BACKGROUND OF THE INVENTION

This invention relates to a three-dimensional image display system, and more particularly, to a system for obtaining an image which includes a sense of the distances and dimensions of the original object by modifying an original image obtained through the voxel method using the surface method, and further modifying the image thus modified using the voxel method.

PRIOR ART

Medical image displays produced by computers are being upgraded for provision of two-dimensional to three-dimensional displays.

Figure 12:
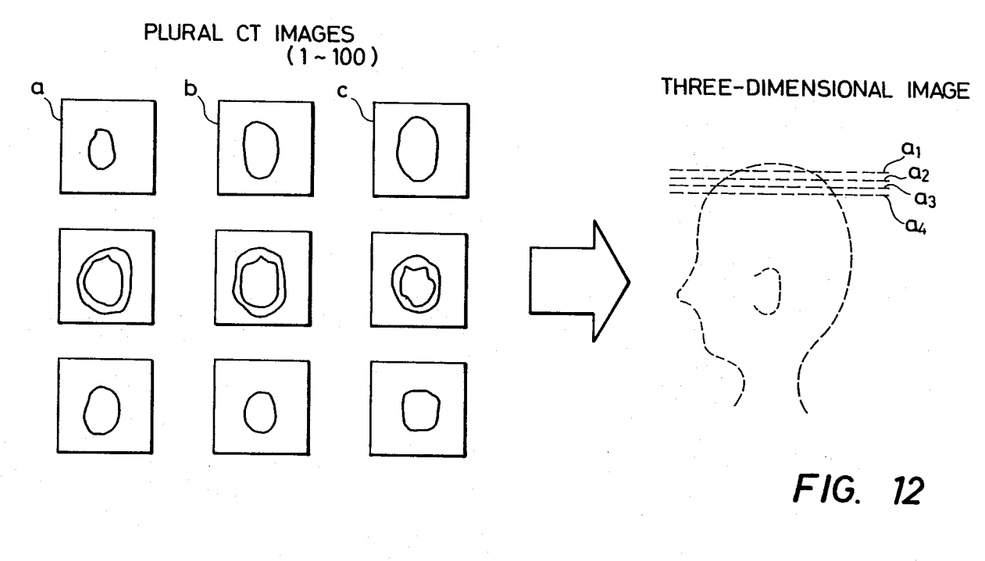
FIG. 12 is an illustration of a three-dimensional image.

Referring to FIG. 12, an example of a CT slice three-dimensional display will be described. A CT apparatus is used to obtain a plurality of CT images $a_1$, $a_2$, $a_3$, of an object being examined In the case of the human brain, the number of slices reaches a maximum of about 100. The CT slice images thus obtained are combined to obtain a three-dimensional image.

Heretofore, an example of three-dimensional image display has been put on record in the 'Isotope News' (December, 1985 issue, published by Japan Isotope Association) under the title of 'Three-Dimensional Medical Image Display by Computers' (pp. 8-9).

As described in the literature, a pseudo-three-dimensional display system is used to achieve three-dimensional image display. In the pseudo-three-dimensional display system, a three-dimensional image of an original object is formed by primarily making use of computer graphics techniques where the image is projected and displayed on an ordinary two-dimensional display.

The pseudo-three-dimensional display system comprises a section-conversion display method and a surface display method. The section-conversion display method is employed for storing an image of the human body collected as a three-dimensional data structure, i.e., a three-dimensional image, in an image memory, cutting it in any desired direction, and reforming and displaying the section thus cut as a two-dimensional image. The high-speed interpolating computation of a variable density value corresponding to the coordinates provides a basis for the method.

The surface display method is usable as the method of displaying the surface of the section obtained through the section-conversion display method or as that of properly displaying the surface of the image itself independently of the individual sections.

The surface display method is also used for forming the surface contours of internal organs and bones having complex structures into three-dimensional images. The surface and voxel methods are typically used for the surface display method.

The surface method is used for providing each of the image elements forming an image with a density corresponding to the gradient defined by the image element and a number of image elements proximate thereto and causing the shadow to be expressed by displaying this density on the image.

The voxel method is employed for providing a density corresponding to the distance representing the depth from a visual point or light source to each image element in an image and causing the shadow to be expressed by displaying this density on the image. Accordingly, image elements forming an image obtained through the voxel method include an indication of the distance from the visual point or the light source to the image elements.

The voxel method is superior to the surface method for displaying the distance representing the depth but disadvantageous in that the contour of small parts of the image are not displayed. On the other hand, the surface method is excellent for accurately displaying the contour of the small part of the image but disadvantageous in that the distance representing depth is not accurately displayed.

The provision of the shadow in the three-dimensional image display can be made by either the voxel or the surface method. However, it is desirable to use both methods properly depending on the position and contour of each image or the point aimed at so as to bring out their features.

For one image, therefore, the voxel method should be used and, for another, the surface method should be employed.

However, both the voxel and surface methods have the aforesaid disadvantages and consequently accurate three-dimensional displays can not be achieved by using the pure voxel or surface method alone.

SUMMARY OF THE INVENTION

An object of the present invention is to provide a system for obtaining an image which includes a sense of the distances and dimensions in the original object by combining surface and voxel methods to bring out the respective features and accurately providing the image with shadows and three dimensions.

In order to accomplish the aforesaid object according to the present invention, each of the density data which exhibits the intensity or brightness for the image elements forming an image obtained through the voxel method is modified with a density gradient determined by the density data of each image element and the plural image elements proximate to the image element. The density data thus modified is used as shade data in the three-dimensional image display system, or is further modified based on the distance from a visual point or light source to the image element including distance information and then used as shade data in the three-dimensional image display system. Otherwise, each of density data of the image elements forming an image obtained through the voxel method is modified with the combination of a gradient determined by the density data of each image element and the plural image elements proximate to the image element with a gradient of the image element with respect to the light source position.

BRIEF DESCRIPTION OF THE DRAWINGS

The invention will now be described in greater detail with reference to the embodiments illustrated in the accompanying drawings, given solely by way of example, in which.

DETAILED DESCRIPTION OF THE INVENTION

A description follows of a first embodiment according to the present invention.

In this embodiment, a method is provided for modifying an image obtained through the voxel method using the surface method and further modifying the image in terms of the distance from a light source to each image element forming the image.

Figure 1:
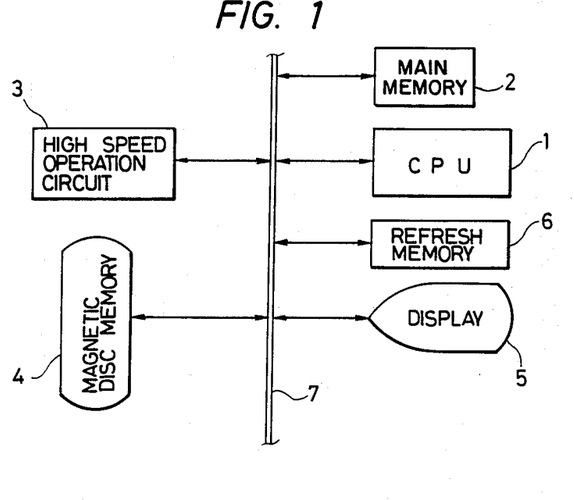
FIG. 1 shows an embodiment of the processing system according to the present invention.

The process involved as shown in FIG. 1 comprises starting high-speed operation circuit 3, computing an original image using the voxel method before the starting of operation circuit 3 and instructing display unit 5 to display the image modified by high-speed operation circuit 3 using the surface method.

High-speed operation circuit 3 is operated so as to compute the image using the surface method from the original image obtained through the voxel method and to further modify the image thus modified by the surface method in terms of the distances between a light source and the image elements forming the image.

Main memory 2 stores programs and various types of data.

Magnetic disc 4 stores image data, including the data of the image before and after it is modified by high-speed operation circuit 3. The image data, before it is modified, is sent by CPU 1 to MM 2 when it is modified while the data is exchanged between MM 2 and high-speed operation circuit 3.

Refresh memory 6 stores the display image, whereas display 5 displays it.

Bus 7, common to all the elements, connects each of the component elements.

Figure 2:
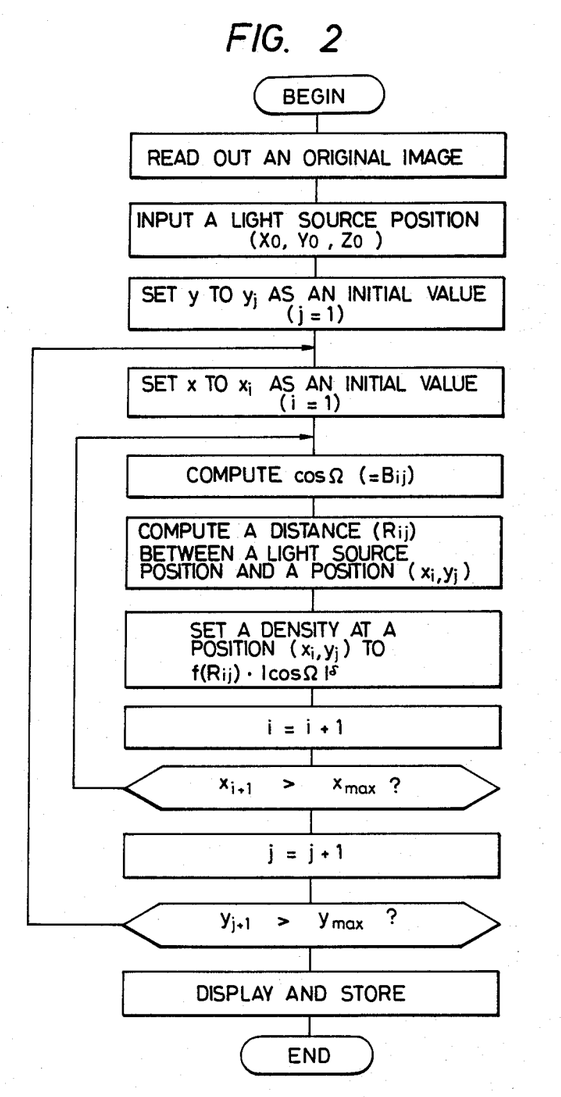
FIG. 2 shows an embodiment of the processing procedure according to the present invention.

FIG. 2 shows a processing procedure according to which high-speed operation circuit 3 is operated. Circuit 3 is started by CPU 1 and executes the processing.

Figure 3:
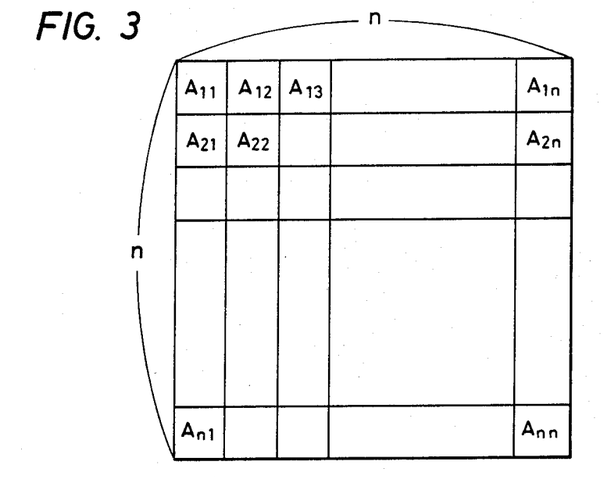
FIG. 3 shows an example of an image obtained using the voxel method.

The original image is first read out of MM 2, the original image being an image obtained using the voxel method. FIG. 3 shows an example of the density data. $A_{ij}$ in each image element indicates the density data which exhibits the intensity or brightness of the surface of the three-dimensional object obtained using the voxel method, which includes an indication of the distance information.

Subsequently, the position of the light source ($x_o$, $y_o$, $z_o$) is written. That position ($x_o$, $y_o$, $z_o$) may be supplied from a keyboard or track pole.

A scanning position (x, y) is initialized. The scanning area for the image obtained using the voxel method is preset. Referring to the example of FIG. 3, for instance, all densities within the range of $A_{1,1}$–$A_{n,n}$ are scanned and the coordinates (1,1)–(n,n) constitute the scanning area. The initialization means that the starting point of the scanning raster in the scanning area is set at (1,1). The final position is (n,n) and thus $x_{max}$, $y_{max}$ are obtained.

Figure 4:
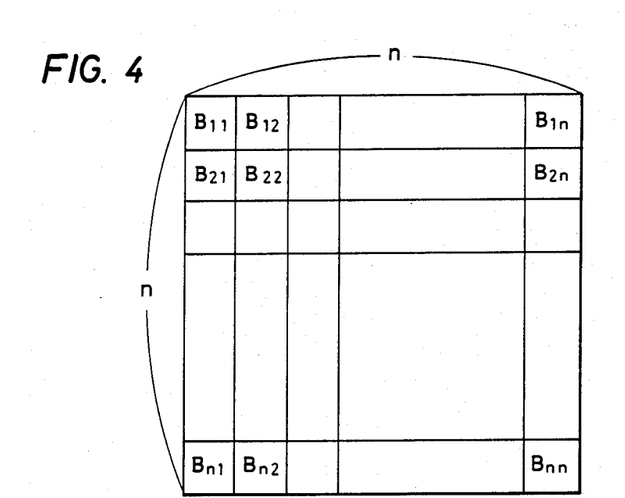
FIG. 4 shows an example of the image modified by the surface method.

Subsequently, a density cos $\Omega$ using the surface method is obtained. FIG. 4 shows the result thus obtained. In FIG. 4, the density obtained through the surface method on each image element is represented by $B_{ij}$.

Figure 5:
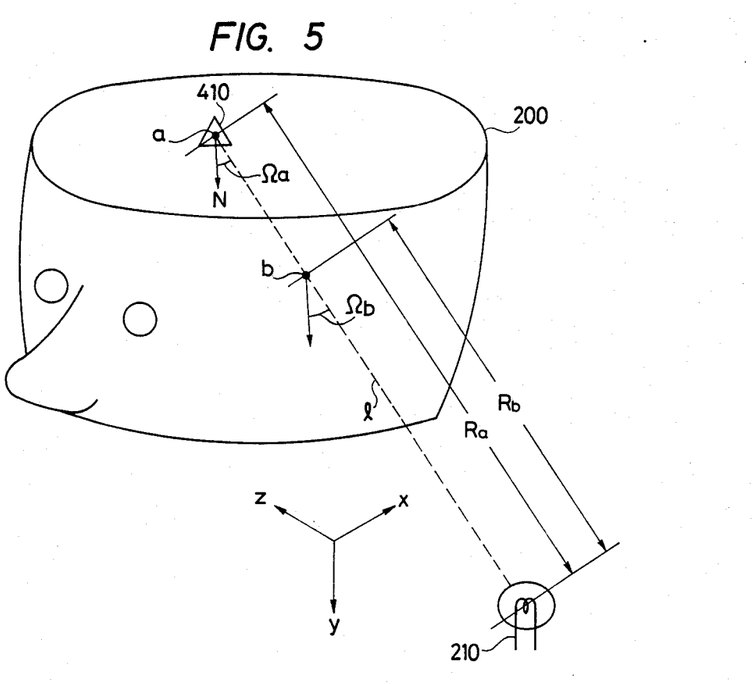
FIG. 5 shows an example of the computation of the image of FIG. 4.

FIG. 5 shows a method of obtaining the density $B_{ij}$. Light source 210 is supplied and a fine plane-element is given to each image element of the image obtained using the voxel method.

The above plane-element is defined by a plurality of image elements located close to each other and its gradient is determined by the density gradient defined by the plurality of image elements. In this embodiment, although a description will be given of triangular plane-element 410 formed by three image points, the present invention is not limited to such an arrangement. The vertexes of triangular plane-element 410 are obtained in the following manner.

Image elements on an area centering on and in close proximity to a point a are taken into consideration. The point may represent either the position of an image element or no image element (a fictitious point). The density of the image elements proximate to the point are obtained using the voxel method. Of the density thus obtained, any desired three points in terms of the plane-element passing through each point are chosen. The plane connecting the three points is referred to as triangular plane-element 410. As the density of an image element represents the depth of the element from the light source in the three-dimensional space, the plane thus obtained includes depth information.

The normal line N of triangular plane element 410 thus extracted is obtained Subsequently, a straight line l connecting the point a and light source 210 is obtained an the gradient $\Omega a$ between the normal line N and the straight line l is obtained. Cosine $\Omega a$ relative to the gradient $\Omega a$ is obtained Cos $\Omega a$ represents the density gradient at the point a. Cos $\Omega a$ becomes the density obtained using the surface method and is $B_{ij}$ in FIG. 4.

The image of FIG. 4 thus obtained is stored in MM2. Subsequently, the image supplied with the density obtained using the surface method is modified according to the distance as follows. First, the data $B_{ij}$ at the scanning point $(x_i, y_j)$ is read from MM2. Then the distance $R_{ij}$ from the light source to the scanning point-. is according to the equation:

$$R_{ij} = \sqrt{(i-x_o)^2 + (y_j-y_o)^2 + (z_k-z_o)^2} \ldots \quad (1)$$

where, $(x_o, y_o, z_o)$ is the position of the light source and $(x_i, y_j, z_i)$ is the position of the scanning point. Subsequently, the distance density $f(R_{ij})$ is computed as follows:

$$f(R_{ij}) = C - R_{ij} \ldots \quad (2)$$

where C is a constant. The distance density $(R_{ij})$ is computed such that the greater the value of $R_{ij}$, the smaller the value of the distance density, whereas the smaller the value of $R_{ij}$, the greater the value of the distance density. Accordingly $f(R_{ij})$ becomes the density obtained using the voxel method, that is, $f(R_{ij})$ includes an indication of the depth (distance) in three-dimensional space.

$B_{ij}$ is modified by $f(R_{ij})$ obtained in Eq. (2). In other words, assuming the value after modification is $P_{ij}$:

$$P_{ij} = B_{ij} \times f(R_{ij}) \ldots \quad (3)$$

Or $\cos \Omega a$ may be displayed from the relationship of $B_{ij} = \cos \Omega a$ and, to be more precise, from the equation:

$$P_{ij} = |\cos \Omega a|^\delta \times f(R_{ij}) \ldots \quad (4)$$

The reason for the use of $(R_{ij})$ for modifying purposes will be described as follows.

In reference to FIG. 5, $\Omega b$ is obtained for a point b on the line l between light source 210 and the point b and the density $\cos \Omega b$ is obtained. The relationship $\cos \Omega a = \cos \Omega b$ may be explained. Although the point a is found far from the point b. The density of both points is expressed as $\cos \Omega a = \cos \Omega b$ since $\Omega a$ and $\Omega b$ represent the gradient at points a and b, that is, the angles between the line between point a and the light source and the normal line N and a line parallel to N, respectively, as shown in FIG. 5. Both of them are indistinguishable from each other.

An image is obtained which includes an indication or sense of distance or depth using $\cos \Omega a$, $\cos \Omega b$. That is, distance densities C-Ra, C-Rb as well as distances Ra, Rb are obtained and the distance densities are multiplied by $\cos \Omega a$, $\cos \Omega b$ to obtain a modified image.

The modified value $P_{ij}$ thus obtained is substantially equivalent to what is obtained by modifying the density obtained using the surface method by the voxel method, that is, $P_{ij}$ is equivalent to the image subjected to the distance modification.

Figure 6:
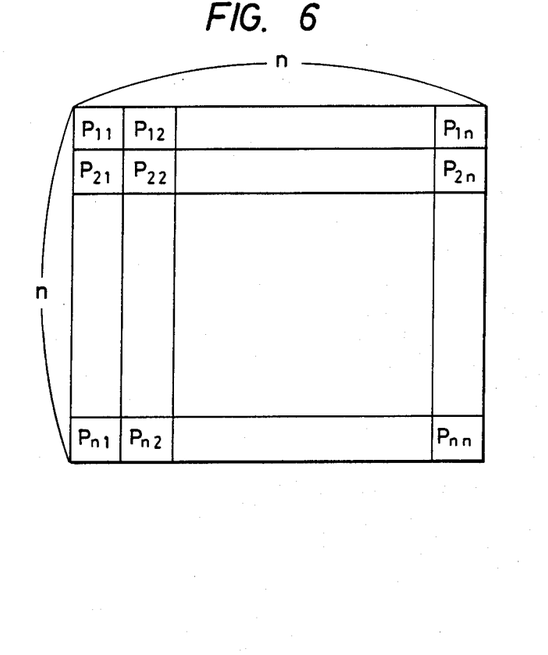
FIG. 6 shows; an example of a modified image of the image of FIG. 4 depending on the distance between a visual point or a light source and an image element.

The aforesaid modification is applied to the whole $B_{ij}$. FIG. 6 shows image data as the result of modification. The image data is kept in magnetic disc memory 4 and sent to refresh memory 6 for display.

In Eq. (4), $\delta$ is a constant determined by the condition of reflection of the original object from which the image has been obtained. The greater the value of $\delta$, the closer the object is located. A value of $\delta = 1$ may often be the case with the human body.

A second embodiment accordingly to the present invention will now be described.

Figure 7:
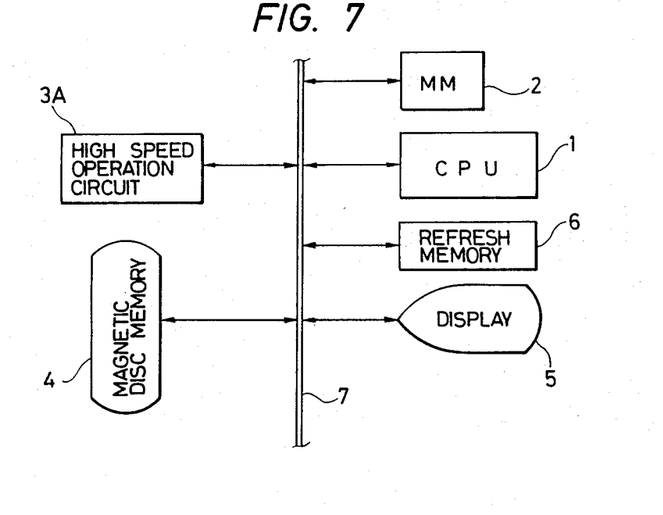
FIG. 7 shows another embodiment of the processing system according to the present invention.

In this embodiment, a method of converting the image obtained through the voxel method into an image using the surface method with respect to the light source position is provided. FIG. 7 shows a processing system for particularly allowing image displays corresponding to light source positions.

Figure 8:
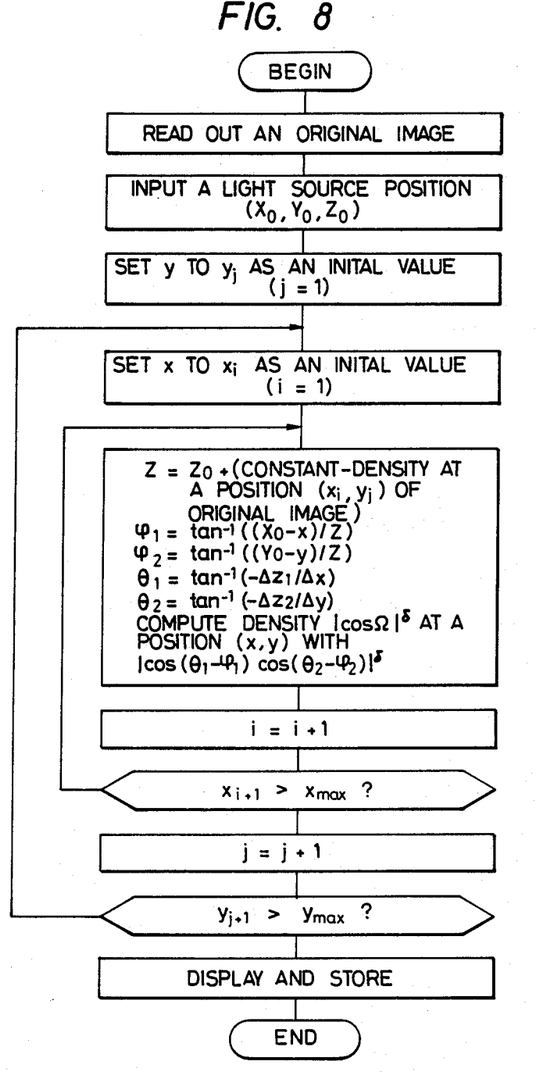
FIG. 8 shows another embodiment of the processing procedure embodying the present invention.

High-speed operation circuit 3A executes a process for the conversion of the image obtained through the voxel method into the image using the surface method. FIG. 8 shows such a processing procedure.

First, CPU 1 starts the high-speed operation circuit, which then reads an original image from MM 2. The original image is the one obtained through the voxel method and has the contents shown in FIG. 3 (however, the value of n is different).

Subsequently, the light source position $(x_o, y_o, z_o)$ is supplied by a track pole. Then x and y are initialized and a scan starting point is specified whereby each point is scanned from right to left and up to down. The final point is assumed to be $(X_{max}, Y_{max})$.

The value of $\cos |\cos \Omega|^\delta$ is obtained. The value of $|\cos \Omega|^\delta$ is not directly obtained but, as shown by the following equation, approximated with the equation (5) obtained by modifying the image using the voxel method by the combination of the density gradient with a gradient with respect to the light source position:

$$|\cos \Omega|^\delta = K \times |\cos(\theta_1 - \Psi_1) \times \cos(\theta_2 - \Psi_2)|^\delta \quad (5)$$

where
$\phi_1 = \tan^{-1}((x_\phi - x)/z)$
$\phi_2 = \tan^{-1}((y_\phi - y)/z)$
$\theta_1 = \tan^{-1}(-\Delta Z_1/\Delta x)$
$\theta_2 = \tan^{-1}(-\Delta Z_2/\Delta y)$
$Z = Z_\phi + $ (constant-brightness of original image scanning point (x, y)) where K is a constant determined by the property of the original object, such as bone, skin or the like.

Figure 9:
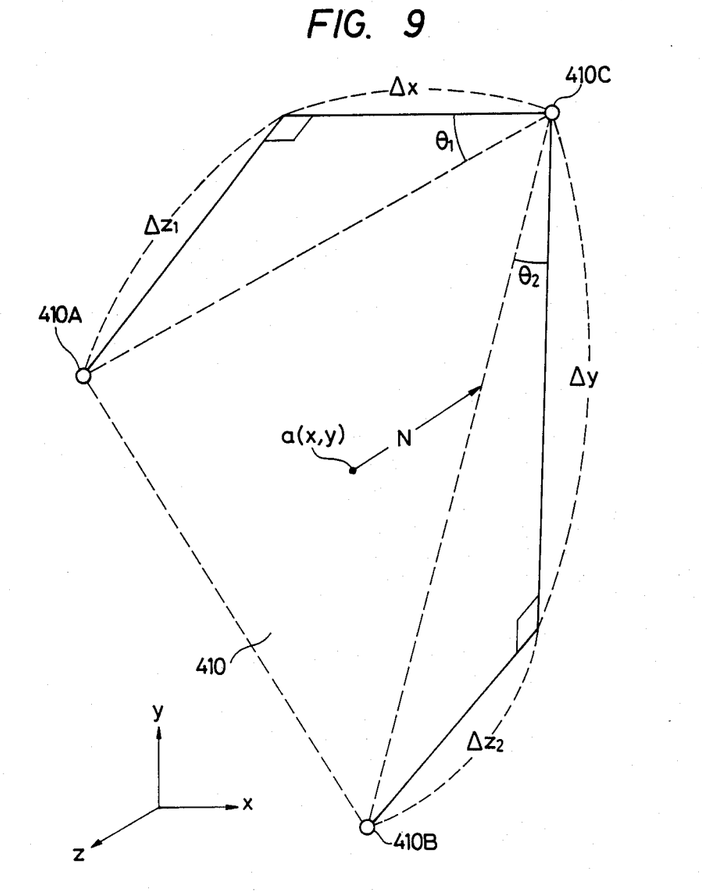
FIG. 9 shows an example of the computation of angles $\theta_1$, $\theta_2$.

Referring to a diagram, the process of computing these values will be described. FIG. 9 shows an example of the computation of $\theta_1, \theta_2$. The plane element 410 at the scanning point (x, y) is obtained pertaining to the image obtained through the voxel method. The plane element is a plane formed from a triangle connecting three points 410A, 410B, and 410C. Displacements $\Delta x$, $\Delta y$, $\Delta Z_1$, $\Delta Z_2$ of the coordinates are obtained from the three points 410B, and 410C of the plane elements as shown in FIG. 9. The angle $\theta_1$ formed by the line connecting the points 410A and 410C with the abcissa is found from these displacements. Further, the angle $\theta_2$ formed by the line connecting the points 410B and 410C with the ordinate is found. The angles $\theta_1, \theta_2$ have the aforesaid relationship with $\Delta Z_1, \Delta Z_2$, y and x.

Figure 10:
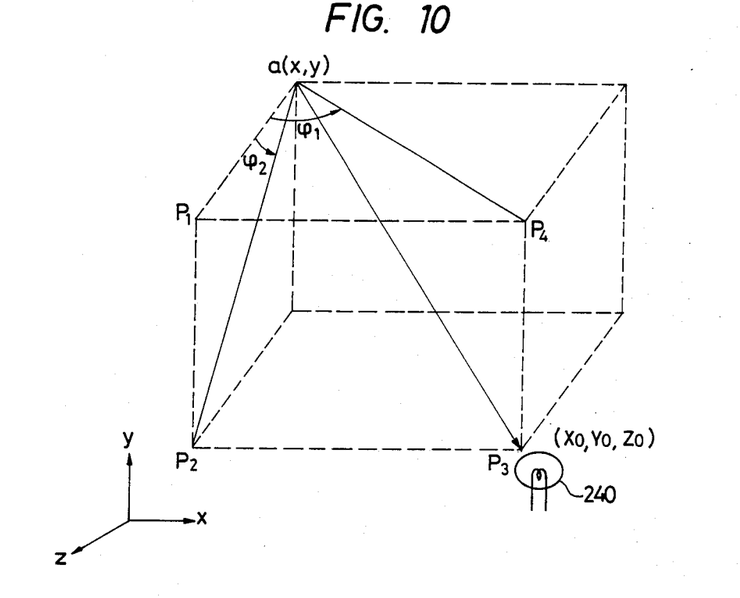
FIG. 10 shows an example of the computation of angles $\phi_1$, $\phi_2$.

FIG. 10 shows an example of the computation of $\phi_1$, $\phi_2$. With the scanning point (x, y) as a criterion and the light source Po as an apex in the opposite direction, a virtual cube (dotted line) shown in FIG. 10 is formed and the gradient $\phi_2$ of the scanning point between the straight line connecting the scanning point and $P_1$ and that connecting $P_2$ and the scanning point is computed. The gradient $\phi_1$ at the scanning point between the straight line connecting the scanning point and $P_4$ and that connecting the scanning point and $P_1$ is computed. The $\phi_1, \phi_2$ can be computed by the aforesaid $y_o, x_o, x, y,$ and z.

Figure 11:
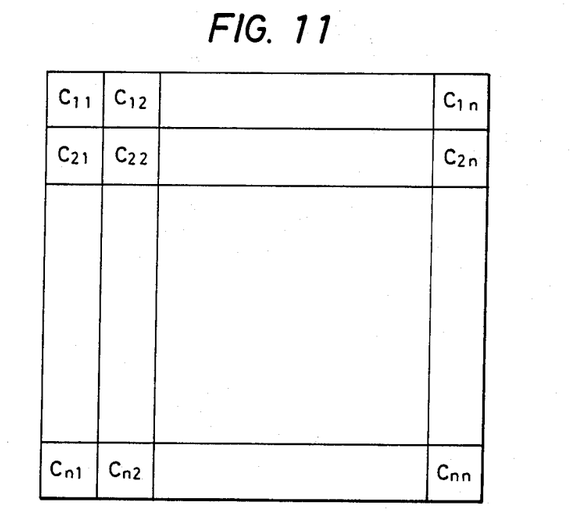
FIG. 11 shows an example of an image modified with the combination of each density gradient of an image element with a gradient with respect to the light source position.

Given that the approximate value $|\cos \Omega|^\delta$ obtained at each scanning point is $C_{ij}$, the data shown in FIG. 11 is obtained. If this data is displayed, a three-dimensional image including a sense of distance can be displayed.

Although the image area has been expressed by $n \times n$, it may be presented by $n \times m$. In place of the circuit for exclusive use at high speed, a logic operation unit actuated under a microprogram system or microprocessor (CPU) may be used to achieve a similar effect. In addition, the light source may be in the form of a point or plane.

A third embodiment according to the present invention will be described.

In this embodiment, a method of modifying density data of an image element obtained using the voxel method with the density gradient determined by the density data of the image elements adjacent to the image element is provided.

Figure 13:
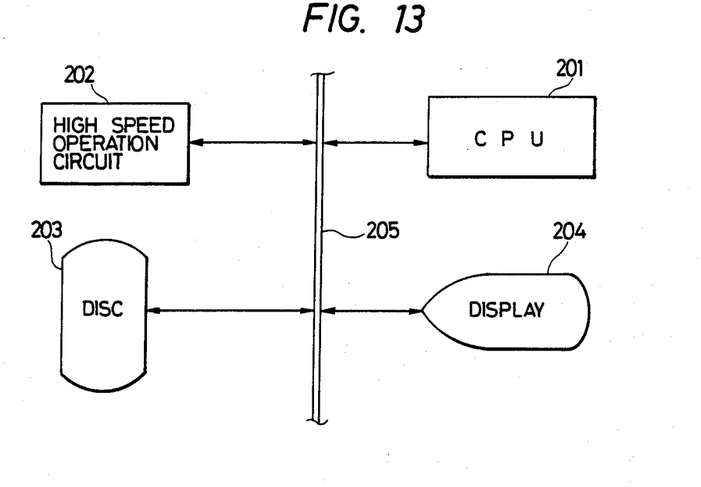
FIG. 13 shows still another embodiment of the processing system according to the present invention.

FIG. 13 shows a three-dimensional processing apparatus applicable to the present invention. A central processing unit (CPU) forms the nucleus of the three-dimensional processing apparatus. Hardware for exclusive use at high speed (apparatus for computing modifying density data) 202 is used to compute modifying density data as the central figure of processing according to the present invention. A disc or drum memory is a large capacity memory and stores data before and after it is processed. Display unit 204 is, e.g., a CRT display unit and provides three-dimensional display. The aforesaid devices are connected to common bus 205.

Figure 14:
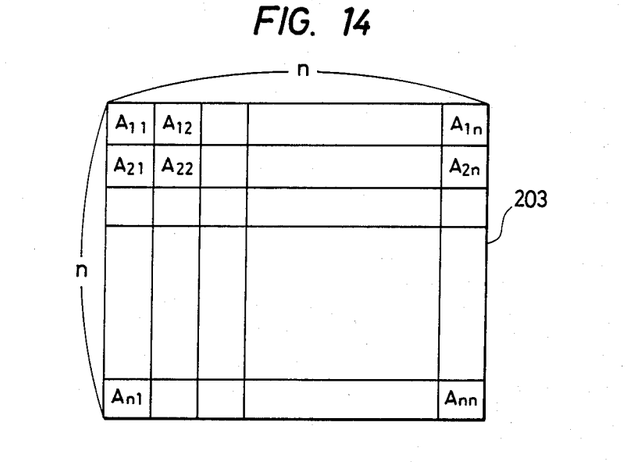
FIG. 14 shows an example of density data obtained using the voxel method.

The density data obtained through the voxel method and arranged for three-dimensional display is stored in disc memory 203. CPU 201 is used to obtain density data from the original image data using the voxel method. CPU 201 is also operated so as to successively read out the original image data stored in the disc memory and process the data under the voxel method to obtain three-dimensional density data. The three-dimensional density data is stored in disc memory 203. FIG. 14 shows the state in which the density data $A_{ij}$ is stored on a picture element basis. In this case, n designates the size of a picture plane or what should be processed under the voxel method.

The modified density data according to the present invention is obtained by modifying the density data $A_{ij}$ according to the density gradient in the proximity of that point (i, j). The operation of modification is carried out by hardware 202 for exclusive use at high speed.

Figure 15:
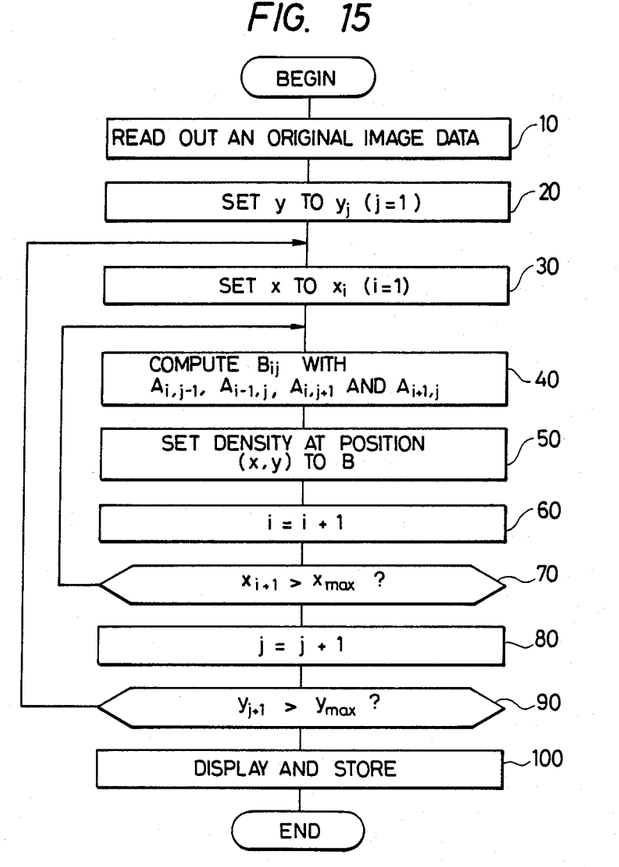
FIG. 15 shows still another embodiment of the processing procedure according to the present invention.
Figure 16A:
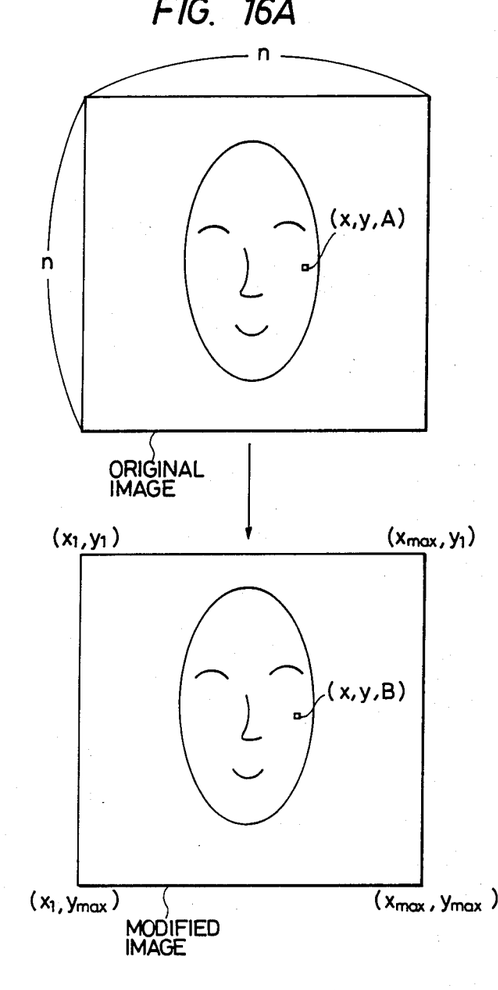
FIG. 16A shows the images before and after image modification.
Figure 16B:
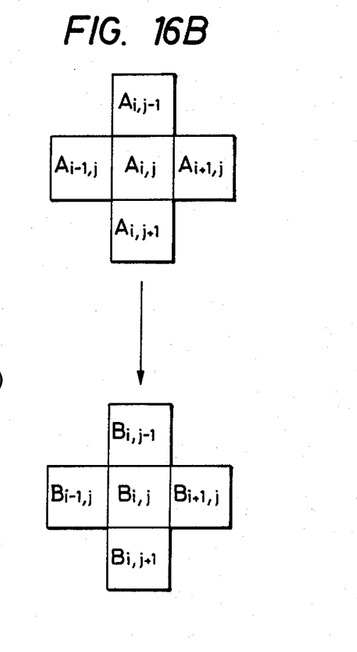
FIG. 16B diagrammatically shows a method of calculating image densities before and after image modification.

The processing procedure and a related illustration are shown in FIGS. 15 and 16 respectively.

The data, prior to being processed, is the density data shown in FIG. 14 and can be stored in disc memory 203 or another high-speed memory. In the following arrangement, it is assumed that the data is processed by the hardware for exclusive use at high speed after it is transferred to the high-speed memory.

In FIG. 15, the processing is undertaken by CPU 201 in steps 10 and 100, whereas hardware 202 for exclusive use at high speed is charged with the processing from steps 20 through 90.

FIG. 16 shows the state in which the example of a display resulting from the density data is converted into that of a display resulting from the modified density data. Density modification using the proximate picture elements is implemented as to all aspects of the original image. The original image means an image derived from the density data. Given that the density at the observation point is $A_{ij}$, FIG. 16 shows an example of modification of the density $A_{ij}$ to $B_{ij}$ by image elements at four points $A_{i,j-1}$, $A_{i-1,j}$, $A_{i,j+1}$, $A_{i+1,j}$ as a neighboring image element. The modification is carried out for all points n×n.

Referring to FIG. 15, the processing procedure will be described in detail.

In step 10, the original image data stored in disc memory 203 is transferred to a main memory (not shown) in CPU 201. After this transfer, CPU 201 relies on special hardware 202 for processing.

Special hardware 202 first initializes the access address of the original image in steps 20 and 30. Assuming the access method according to the raster scanning system is employed, $(x_i, y_j)$ of FIG. 16 may be applied.

With respect to the $(x_i, y_j)$, as shown in FIG. 16(B), the proximate image elements are taken out (step 40). In FIG. 16(B), the density of $(x_i, y_j)$ was represented as $A_{ij}$ and the densities of both the image elements at $x_{i-1}$ and $x_{i+1}$ adjacent thereto in the direction of x was represented as $A_{i-1,j}$, $A_{i+1,j}$. Taking into account the gradients $(A_{i-1,j}, A_{i+1,j})$, $(A_{i,j-1}, A_{i,j+1})$ of the image densities at the four points, the modified density data $B_{ij}$ of $(x_i, y_j)$ is obtained (step 40) using the following equation:

$$B = K \, x |\cos \theta_1 \times \cos \theta_2|^\delta \ldots \quad (7)$$

where $\delta$ is the constant determined by the reflection state of the original object from which the image has been obtained and, for a non-reflective body, $\delta = 1$, whereas for a reflective body, $\delta > 1$. Accordingly, the closer the object is located, the greater the value of $\delta$. For instance, it is common to set the constant $\delta$ at roughly 1.5–2.0 for metal; $\delta = 1$ for plaster; and $\delta = 1$ for a human body (however, $\delta$ for a human body may be variable depending on the bone and skin conditions).

The angles $\theta_1$ and $\theta_2$ are formed between the abscissa and a minute plane-element determined by the above four points and between the ordinate and minute plane-element, respectively.

Therefore, Eq. (7) is substituted for the following in the proximity four point method shown in FIG. 16(B):

$$B_{ij} = Kx |(2/\sqrt{4 + G(A_{i-1,j} - A_{i+1,j})^2} \\ \times 2/\sqrt{4 + G(A_{i,j-1} - A_{i,j+1})^2})|^\delta \quad (8)$$

where K is a constant determined by the property of the original object such as bone, skin or the like and G is the distance per density unit for instance G=1.

$B_{ij}$ thus obtained becomes the density of $(x_i, y_i)$ and replaces the density $A_{ij}$ obtained under the voxel method (step 50).

In step 60, the observation point is moved to the right by one point with $x_i$ as $(x_{i+1})$ and, in step 70, whether or not $x_{max}$ has been attained is checked. In step 80, the observation point is moved down by one point with $y_j$ as $y_{j+1}$ and, in step 90 further, whether or not $y_{max}$ has been attained is checked. Up to those steps 60–90, scanning only according to the raster system is indicated.

Figure 17:
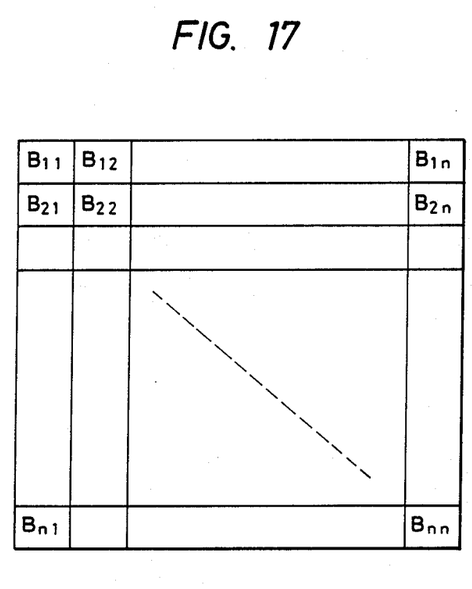
FIG. 17 shows an example of modified density data obtained using the surface method

Step 100 refers to processing in CPU 201, where the results are stored with display made by display unit 204. FIG. 17 shows the results. The ultimate storage may be effected by disc memory 203 and, when the contents are displayed, they are stored in the refresh memory before being displayed.

Although the modification has been arranged on a neighboring one-point basis, it may be more accurate if implemented on a neighboring two- or three-point basis.

Although it has been so arranged that the density data under the voxel method is modified, the density data under the voxel method and the modified density data both may be utilized. In this case, while the density data under the voxel method is kept as it is, the modified density data is computed based on the density data under the voxel method and both sets of data are stored in the memory.

It has also been so arranged as to separate the gradient in the direction of x from that in the direction of y. However, both of them may be entwined and intended for modification. Moreover, such modification may be effected by an operation unit executing processing based on microprograms in place of the hardware for exclusive use at high speed.

As set forth above, the use of the combination of the voxel and surface methods according to the present invention makes it possible to obtain a three-dimensional image producing the improved sense of distances and dimensions of the original object being imaged.

Although the invention has been described with reference to particular means, methods, and embodiments, it is to be understood that the invention is not confined to the embodiments described in the foregoing and illustrated herein, but extends to all equivalents within the scope of the claims.

What is claimed:

1. A three-dimensional image display method for displaying a three-dimensional image including depth and distance information comprising the steps of:
   obtaining a densified three-dimensional image according to the distance information of an original three-dimensional image using a voxel method; and
   modifying said densified three-dimensional image using a surface method, said surface method comprising the steps of determining each minute image element group comprising plural image elements proximate to each other over all image elements forming said densified three-dimensional image obtained under the voxel method, computing a density gradient defined by said each minute image element group based on density data of said plural image elements, substituting each modified density data modified according to said density gradient for the density data of said plural image elements obtained under voxel method, and displaying said modified density data on a display.

2. The three-dimensional image display method as claimed in claim 1 wherein said minute image group comprises plural image elements proximate to an arbitrary image element.

3. The three-dimensional image display method as claimed in claim 2 wherein said plural image elements comprise two first image elements ($A_1$, $A_3$) located in a vertical direction and two second image elements ($A_2$, $A_4$) located in right and left directions with respect to said arbitrary image element, and wherein the modified density data (B) is determined by the following equation:

$$B = K |2/\sqrt{4+G(A_2-A_4)^2} \times 2/\sqrt{4+G(A_1-A_3)^2}|^\delta$$

where $\delta$, $K$, and $G$ are constants.

4. The three-dimensional image display method as claimed in claim 1 said method further comprising a distance modifying method for modifying the modified density data of said image elements forming the image obtained using said surface method according to distances between said image elements obtained using said surface method and a light source and wherein said modified density data is displayed.

5. The three-dimensional image display method as claimed in claim 4 wherein said density data obtained using said surface method is a cosine of an angle between a line normal to the density gradient defined by said minute image element group and a straight line connecting said minute image element group and said light source.

6. The three-dimensional image display method as claimed in claim 4 wherein said distance modifying method comprises the steps of:
   determining a distance ($R_{i,j}$) between each of said image elements forming the image obtained using said surface method and a light source, computing a distance density $f(R_{i,j})$ with the equation (1), and computing the modified density data ($P_{i,j}$) from said density data ($B_{i,j}$) with the equation (2) wherein $$f(R_{i,j}) = C - R_{i,j} \quad (1)$$

$$P_{i,j} = B_{i,j} \times f(R_{i,j}) \quad (2)$$

where C is a constant.

7. The three-dimensional image method display as claimed in claim 1 wherein said minute image element group forms a minute triangular plane-element comprising three image elements proximate to each other.

8. The three-dimensional image display method as claimed in claim 7 wherein said density gradient is obtained by determining a line (N) normal to said minute triangular plane-element and a straight line (1) connecting said minute triangular plane-element and a light source, computing an angle ($\Omega$) between said normal line (N) and said straight line (1), and setting said density gradient to $\cos \Omega$.

9. The three-dimensional image display method as claimed in claim 7 said method further comprising a method for modifying said density gradient of each of said image elements obtaining using said surface method with respect to the distance from a light source to each of said image elements obtained using said surface method to obtain a modified density gradient.

10. The three-dimensional image display method as claimed in claim 9 wherein said method for obtaining said modified density gradient comprises the steps of:
    determining angles $\theta_1$, $\theta_2$ between two sides of said minute triangular plane-element and x and y axes of arbitrary coordinates, respectively;
    determining an angle $\phi_1$, between a z-axis and a projected straight line on an x-z plane of a straight line connecting each of said image elements obtained using said surface method and a light source, and an angle $\phi_2$ between the z-axis and a projected straight line on a y-z plane of said straight line connecting each of said image elements obtained using said surface method and said light source; and
    computing said modified density gradient (C) with the following equation:

$$C = K \times |\cos(\theta_1, -\delta_1) \times \cos(\theta_2 - \delta_2)|^\delta$$

where K and $\delta$ are constants.

11. The three-dimensional image display method as claimed in claim 1 wherein said original three-dimensional image comprises CT slice images or projection images.

12. A three-dimensional image display system for displaying a three-dimensional image of a subject, said system comprising:
    storing means for storing an original image of said subject, said original image obtained using a voxel method, said original image comprising a plurality of image elements, each of said plurality image elements comprising density data;

means for reading said stored original image;

means for obtaining a modified three-dimensional image using a density gradient method; and display means for displaying said modified three-dimensional image.

13. The three-dimensional image display system as claimed in claim 12 wherein said means for obtaining comprises:

means for determining a plurality of minute image element groups forming said original image, each group consisting of a number of said image elements proximate to each other;

means for calculating a density gradient defined by each of said groups based on the density data of the image elements within the group;

means for modifying the image elements of the original image by substituting modified density data, modified by the density gradient, for the density data of the original image wherein said display means displays said modified density data.

14. The three-dimensional image display system as claimed in claim 13 wherein each of said minute image elements comprise plural image elements proximate to an arbitrary image element.

15. The three-dimensional image display system as claimed in claim 14 wherein said plural image elements comprises two first image elements ($A_1$, $A_4$) located in a vertical direction and two second image elements ($A_2$, $A_4$) located in right and left directions with respect to said arbitrary image element, and wherein said modified density data (B) is determined by the equation:

$$B = K \times |2/\sqrt{4 + G(A_2-A_4)^2} \times 2/\sqrt{4 + G(A_1-A_3)^2}|^\delta$$

where $\delta$, K, and G are constants.

16. The three-dimensional image display system as claimed in claim 13 further comprising means for further modifying said modified density data according to distances between each of said modified image elements and a light source and wherein said display means displays said further modified density data.

17. The three-dimensional image display system as claimed in claim 16 wherein said modified density data is a cosine of an angle between a line normal to the density gradient defined by said minute image element group and a straight line connecting said minute image element group and said light source.

18. The three-dimensional image display system as claimed in claim 16 wherein said means for further modifying comprises:

means for determining a distance $R_{i,j}$ between each of said modified image elements and a light source;

means for calculating a distance density $f(R_{i,j})$; and means for calculating the modified density data $P_{i,j}$ based on the density data $B_{i,j}$, wherein $$f(R_{i,j}) = C - R_{i,j} \text{ and}$$

$$P_{i,j} = B_{i,j} \times f(R_{i,j})$$

where C is a constant.

19. The three-dimensional image display system as claimed in claim 13 wherein said minute image element group forms a minute triangular plane-element comprising three image elements proximate to each other.

20. The three-dimensional image display system as claimed in claim 19 wherein said means for calculating the density gradient comprises:

means for determining a line normal to said minute triangular plane-element and a straight line connecting said minute triangular plane-element and a light source;

means for computing as angle $\Omega$ between said normal line and said straight line; and means for setting said density gradient to $\cos \Omega$.

21. The three-dimensional image display system as claimed in claim 19 further comprising means for modifying said density gradient of each of said modified image elements according to the distance from a light source to each of said modified image elements to obtain a modified density gradient.

22. The three-dimensional image display system as claimed in claim 21 wherein said means for modifying said density gradient comprises:

means for determining angles $\theta_1$, $\theta_2$ between two sides of said minute triangular plane-element, and x and y axes of arbitrary coordinates, respectively;

means for determining an angle $\phi_1$, between a z-axis and a projected straight line on an x-z plane of a straight line connecting each of said modified image elements and the light source, and an angle $\phi_2$ between a z-axis and a projected straight line on a y-z plane of said straight line connecting each of said modified image elements and said light source; and means for calculating said modified density gradient C wherein $$C = K \times |\cos(\theta_1 - \phi_1) \times \cos(\theta_2 - \phi_2)|^\delta$$

where K and $\delta$ are constants.

23. The three-dimensional image display system as claimed in claim 13, wherein said original three-dimensional image comprises CT slice images or projection images.

* * * * *